(12) United States Patent
Jamison et al.

(10) Patent No.: US 12,059,655 B2
(45) Date of Patent: Aug. 13, 2024

(54) TREATING FLUIDS RECOVERED FROM WELL OPERATIONS USING A GRAPHENE OXIDE COATED MEMBRANE

(71) Applicant: Halliburton Energy Services, Inc., Houston, TX (US)

(72) Inventors: Dale E. Jamison, Houston, TX (US); William Walter Shumway, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 289 days.

(21) Appl. No.: 17/641,073

(22) PCT Filed: Oct. 11, 2019

(86) PCT No.: PCT/US2019/055855
§ 371 (c)(1),
(2) Date: Mar. 7, 2022

(87) PCT Pub. No.: WO2021/071509
PCT Pub. Date: Apr. 15, 2021

(65) Prior Publication Data
US 2022/0339586 A1    Oct. 27, 2022

(51) Int. Cl.
*B01D 21/00*    (2006.01)
*B01D 21/26*    (2006.01)
(Continued)

(52) U.S. Cl.
CPC ....... *B01D 69/108* (2022.08); *B01D 21/0084* (2013.01); *B01D 21/262* (2013.01);
(Continued)

(58) Field of Classification Search
CPC ............ B01D 21/0084; B01D 71/0211; B01D 71/024; C02F 1/44
See application file for complete search history.

(56) References Cited

U.S. PATENT DOCUMENTS 11,739,247 B1    8/2023  Boul
2009/0057224 A1  3/2009  Huang et al.
(Continued)

FOREIGN PATENT DOCUMENTS

KR    101837230 B1    3/2018
RU    2012125859 A    1/2014
(Continued)

OTHER PUBLICATIONS

Hou, Wenjun, et al. "Graphene oxide coated quartz sand as a high performance adsorption material in the application of water treatment." Rsc Advances 5.11 (2015): 8037-8043. (Year: 2015).*

(Continued)

*Primary Examiner* — Bradley R Spies
(74) *Attorney, Agent, or Firm* — Conley Rose, P.C.; Rodney B. Carroll

(57) ABSTRACT

Systems and methods using: a membrane unit to treat fluids recovered from an oil and gas well are provided. The membrane unit may include a membrane having a porous substrate at least partially coated with graphene oxide, making the membrane hydrophilic. The membrane separates water from other components within a fluid stream. The membrane unit may include an inlet to receive a fluid stream into the membrane unit. The fluid stream may be pretreated prior to reaching the membrane unit The membrane unit may also include a first outlet in fluid communication with one side of the membrane and a second outlet in fluid communication with the opposite side of the membrane.

20 Claims, 8 Drawing Sheets

(51) Int. Cl.
| | |
|---|---|
| *B01D 36/04* | (2006.01) |
| *B01D 61/58* | (2006.01) |
| *B01D 63/06* | (2006.01) |
| *B01D 63/08* | (2006.01) |
| *B01D 65/08* | (2006.01) |
| *B01D 69/02* | (2006.01) |
| *B01D 69/10* | (2006.01) |
| *B01D 71/02* | (2006.01) |
| *C02F 1/00* | (2023.01) |
| *C02F 1/38* | (2023.01) |
| *C02F 1/44* | (2023.01) |
| *E21B 21/06* | (2006.01) |
| *C02F 101/32* | (2006.01) |
| *C02F 103/10* | (2006.01) |
| *C02F 103/36* | (2006.01) |

(52) U.S. Cl.
CPC ........... *B01D 36/045* (2013.01); *B01D 61/58* (2013.01); *B01D 63/08* (2013.01); *B01D 63/087* (2013.01); *B01D 65/08* (2013.01); *B01D 69/02* (2013.01); *B01D 69/107* (2022.08); *B01D 71/0211* (2022.08); *B01D 71/024* (2013.01); *C02F 1/004* (2013.01); *C02F 1/385* (2013.01); *C02F 1/44* (2013.01); *E21B 21/063* (2013.01); *B01D 63/066* (2013.01); *B01D 2311/04* (2013.01); *B01D 2313/201* (2022.08); *B01D 2319/025* (2013.01); *B01D 2319/06* (2013.01); *B01D 2321/2041* (2013.01); *B01D 2325/36* (2013.01); *B01D 2325/38* (2013.01); *C02F 2101/32* (2013.01); *C02F 2103/10* (2013.01); *C02F 2103/365* (2013.01); *C02F 2301/08* (2013.01)

(56) References Cited

U.S. PATENT DOCUMENTS

| | | |
|---|---|---|
| 2011/0108270 A1 | 5/2011 | Crews et al. |
| 2013/0146536 A1 | 6/2013 | Tarabara et al. |
| 2014/0216946 A1* | 8/2014 | Milner ............ C02F 1/24 |
| | | 210/639 |
| 2016/0052814 A1* | 2/2016 | Leyendecker ........ E21B 21/068 |
| | | 210/257.1 |
| 2017/0174537 A1 | 6/2017 | Zheng et al. |
| 2018/0001267 A1 | 1/2018 | Lee et al. |
| 2018/0333654 A1 | 11/2018 | Hugonin |
| 2019/0126210 A1* | 5/2019 | Qahtan ............ B01D 17/085 |
| 2023/0279283 A1 | 7/2023 | Pang et al. |

FOREIGN PATENT DOCUMENTS

| | | |
|---|---|---|
| WO | 85/00532 A1 | 2/1985 |
| WO | 2012/176130 A1 | 12/2012 |
| WO | 2018/185746 A1 | 10/2018 |
| WO | 2023168263 A1 | 9/2023 |

OTHER PUBLICATIONS

Office Action United Kingdom Intellectual Property Office (4 pages) Dec. 18, 2023, Application No. GB2203295.7 filed Oct. 11, 2019.
International Search Report and Written Opinion issued in related PCT Application No. PCT/US2019/055855 mailed Jul. 6, 2020, 11 pages.

* cited by examiner

TREATING FLUIDS RECOVERED FROM WELL OPERATIONS USING A GRAPHENE OXIDE COATED MEMBRANE

CROSS-REFERENCE TO RELATED APPLICATION

The present application is a U.S. National Stage Application of International Application No. PCT/US2019/055855 filed Oct. 11, 2019, which is incorporated herein by reference in its entirety for all purposes.

BACKGROUND

The present disclosure relates to systems and methods for treating fluids recovered from a welt.

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

Throughout these various subterranean operations including drilling, completions, well treatment operations, and production, fluids are cycled through the downhole system and recovered at the surface of the well. The fluids recovered at the surface may include, for example: brine-based completion fluids that are cycled through a well to maintain well pressure during completion operations, "slop water" containing drilling mud or oil that is recovered at the surface during drilling or production operations of an offshore drilling rig; and recovered fracturing fluid containing oil, solids, and other contaminants after performing stimulation operations on a well. Due to increased costs for obtaining and later disposal of these various well process fluids, it is now recognized that a need exists for systems and methods to effectively treat fluids recovered from the well to reduce costs associated with disposal of the fluids and, where possible, to allow for reuse or recycling of the fluids.

BRIEF DESCRIPTION OF THE DRAWINGS

These drawings illustrate certain aspects of some of the embodiments of the present disclosure, and should not be used to limit or define the claims.

Figure 1A:
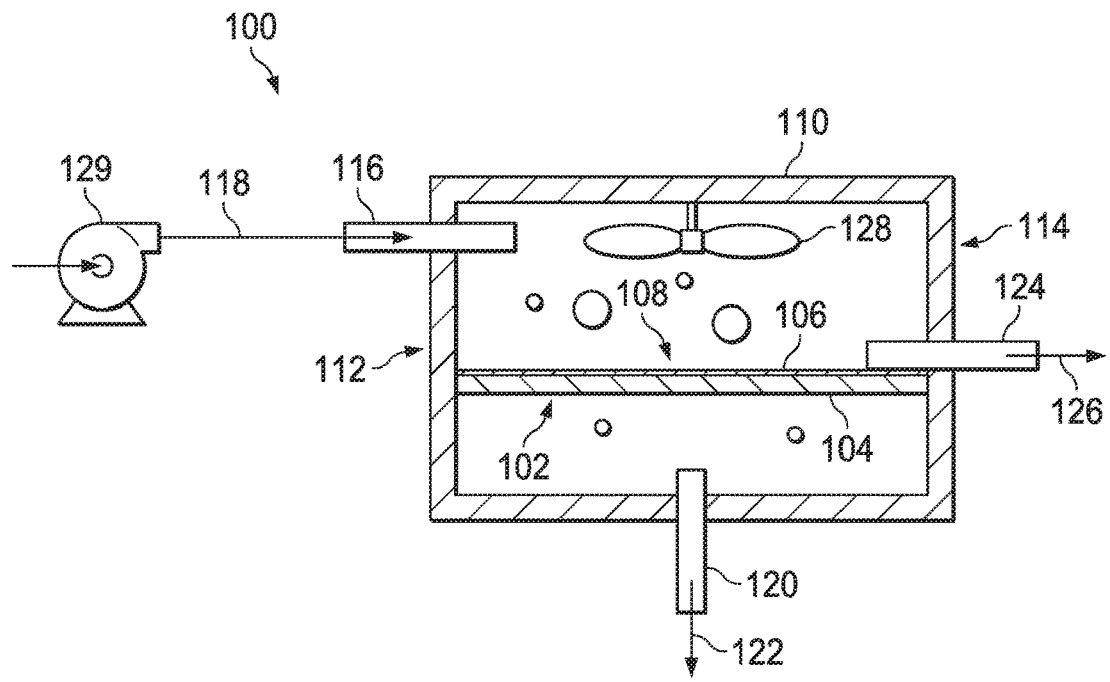
FIG. 1A is a cross-sectional schematic view of a membrane unit with a flat membrane coated with graphene oxide in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating fluids recovered from wells during subterranean operations. More particularly, the present disclosure relates to systems and methods for use of a membrane coated with graphene oxide to treat various fluids including, but not limited to, completion fluids, slop water, and fracturing fluids.

Management of fluids used in wellbore operations and later recovered to the surface poses challenges, especially as the depth and complexity of modern oil and gas wells increases. Drilling mud, completion fluids, fracturing fluids, and produced water are recovered to the surface with many contaminants in the form of solids, oil, fines, and water from the subterranean formation, among others. Where possible, it is desirable to treat the recovered fluid so that it can be reused, recycled, or disposed of with minimal cost. Some examples of challenges experienced in managing various fluids recovered from the well are described below.

In management of completion fluids, it may be desirable to reuse the brine from recovered completion fluids, thereby minimizing the cost of the brine used during completion operations. This is particularly the case when higher quality, higher density, and/or expensive brines are used in the completion operations. Upon the completion fluid returning to the surface, water contamination from the subsurface formation can dilute the fluid and reduce the density of the brine, making the brine unsuitable for reuse in some cases. One way to remediate the problem is to add dry salt to the recovered brine to increase the density of the brine. However, when dry salt is added in this manner, the brine volume increases. At some point, the storage of such large quantities of brine may become difficult and costly due to limited storage space. This is exacerbated due to the increasing depth of wells in which such completion fluids are being used. As a result, recovered brines are often discarded after use. The present disclosure provides certain systems and methods to remove excess water from recovered brines so that the brine can easily be stored for reuse without increasing storage costs.

In management of slop water on an offshore rig site, it may be desirable to clean the slop water recovered from the well and other locations at the rig site to the point where the water can be discharged directly from the rig site. Conventional management of slop water at an offshore rig site is costly, as all slop water is typically shipped to shore for treatment and disposal. In addition to high transportation costs, the process of shipping the slop water to shore for treatment can lead to inefficiencies and risks associated with the logistics of transport. The present disclosure provides certain systems and methods to remove contaminants from slop water at the offshore rig site so that the resulting water is clean enough for discharge to the environment.

In management of fracturing fluid, it may be desirable to clean the fracturing fluid recovered from the well for reuse or easy disposal. Water used during fracturing operations, upon returning to the surface, can be contaminated with wellbore fluids and solids. The present disclosure provides certain systems and methods to remove contaminants from fracturing fluid recovered from the well such that the resulting water is clean enough for discharge to the environment.

The present disclosure provides a membrane unit for use in treatment of fluids recovered from an oil and gas well. The membrane unit may include a membrane having a porous substrate at least partially coated with graphene oxide. The membrane separates water from other components within a fluid stream. The membrane unit may include an inlet to receive a fluid stream into the membrane unit. The fluid stream may be pretreated prior to reaching the membrane unit. The membrane unit may also include a first outlet in fluid communication with one side of the membrane and a second outlet in fluid communication with the opposite side of the membrane.

The fluid treatment systems and methods described herein may utilize a membrane having a polymeric, ceramic, metal, or other porous substrate that is coated with graphene oxide. The graphene oxide coating is hydrophilic and oleophobic. Thus, the natural tendency is for water to migrate through the membrane with little or no differential pressure applied to the membrane itself. As a result, the graphene oxide coated membrane essentially draws water across the membrane while preventing brine, oil, and contaminants from moving across the membrane. The graphene oxide coated membrane may provide enhanced separation of water from other portions of fluids recovered from a well, as compared to conventional fluid treatment methods.

Among the many potential advantages to the systems and methods of the present disclosure, only some of which are alluded to herein, the systems and methods of the present disclosure may provide improved treatment of fluids recovered from wells, inter alia, because the membrane units disclosed herein enable water to be more easily separated from other fluids and contaminants than certain conventional membrane filters known in the art. As a result, recovered fracturing fluids and slop water may be treated via the membrane unit to provide potable water that can be discharged without environmental impact. Additionally, recovered completion fluids may be treated via the membrane unit to separate a large portion of water from the completion fluids such that the resulting higher density brines can be reused without compromising available storage space. In certain embodiments, the disclosed systems and methods may provide the ability for controlling brine density even before the brine is pumped downhole, such that less costly brines may be treated to a higher density for use in completion operations. As such, the disclosed membrane units may decrease the costs associated with disposal of completion fluids, slop water, fracturing fluids, and other fluids used within an oil and gas well and allow for reuse of fluids that have conventionally not be reused.

The membrane unit used in the disclosed fluid treatment systems and methods may include a cross flow membrane. That is, the membrane unit may be arranged with one inlet and at least two outlets. The inlet of the membrane unit receives a feed in the form of an incoming fluid stream, and a first outlet of the membrane unit outputs a filtrate while a second outlet of the membrane outputs a retentate (or concentrate). In this manner, the incoming fluid stream is able to flow over the membrane without solids in the fluid stream packing off against the membrane. Due to the hydrophilic nature of the membrane used in the disclosed membrane unit, the filtrate output from the first inlet of the membrane unit includes water. In certain embodiments, the filtrate may be entirely water. The filtrate may include water with less than about 2000 ppm of remaining contaminants, or alternatively, less than about 1000 ppm of remaining contaminants, or alternatively, less than about 500 ppm of remaining contaminants. In some embodiments, the disclosed membrane unit may include only a single membrane over which the fluid stream is flowed. In other embodiments, the membrane unit may feature multiple membranes over which the fluid stream flows. The membrane unit may function as a passive membrane through which the fluid stream is separated over time into permeate and retentate. In an embodiment, the membrane unit may include a stirring or agitation device disposed in the membrane unit to stir the fluid located therein so that no filter cake forms across the membrane over time. In certain embodiments, it may be desirable to flow the fluid stream through the membrane unit via a pump to maintain a slight differential pressure across the membrane to encourage separation of the permeate from the retentate. The pump may maintain a pressure differential across the membrane within a range of approximately 1 to 100 psi, or alternatively, approximately 1 to 25 psi, or alternatively, approximately 1 to 10 psi. In some embodiments, the pump may be in fluid communication with the inlet of the membrane unit and with the second outlet of the membrane unit such that the pump is able to continuously cycle the retentate (or a portion thereof) back through the membrane unit. In certain embodiments, the membrane may be cycled through a system that continually cleans and renews the surface of the membrane. Still other arrangements of the membrane unit will be apparent to those of ordinary skill in the art.

The disclosed membrane unit may include any desired shape or arrangement of the graphene oxide coated membrane disposed therein. For example, the membrane may take the form of one or more flat sheets. FIG. 1A illustrates a membrane unit 100 having a housing 110 and a membrane 102 disposed in the housing 110. The membrane 102 may include a substrate 104 in the form of a porous flat sheet. The flat sheet may include grapheme oxide 106 coated on one planar side 108 of the porous substrate 104, this side facing toward the incoming fluid stream 118 flowing within the membrane unit 100. In an embodiment, the membrane 102 may include a flat sheet extending from one end 112 of the membrane unit 100 to an opposite end 114 of the membrane unit 100. In another embodiment (not shown), the membrane unit may include multiple flat sheet membranes disposed at different positions along a main flow path for the fluid stream flowing through the membrane unit. The membrane unit 100 of FIG. 1A may include an inlet 116 to receive a fluid stream 118 into the membrane unit 100, a first outlet 120 in fluid communication with one side (opposite the graphene oxide coating 106) of the membrane 102 to output a permeate 122, and a second outlet 124 in fluid communication with the opposite side (facing the graphene oxide coating 106) of the membrane 102 to output a retentate 126. The membrane unit 100 may include a stirring or agitation device 128 disposed in the membrane unit 100 on a side of the membrane 102 facing the graphene oxide coating 106. The stirring or agitation device 128 may stir the fluid located in the membrane unit 100 so that no filter cake forms across the membrane 102 over time. In addition, the stirring or agitation device 128 may generate a relatively low pressure differential across the membrane 102. The membrane unit 100 may receive the fluid stream 118 through the inlet 116 under a desired amount of pressure from a pump 129 in fluid communication with the inlet 116, and this pressure may provide a relatively low pressure differential across the membrane 102. Keeping the pressure differential within a range of approximately 1 to 25 psi, or alternatively, approximately 1 to 10 psi may enable the membrane unit 100 to function essentially as a passive membrane.

Figure 1B:
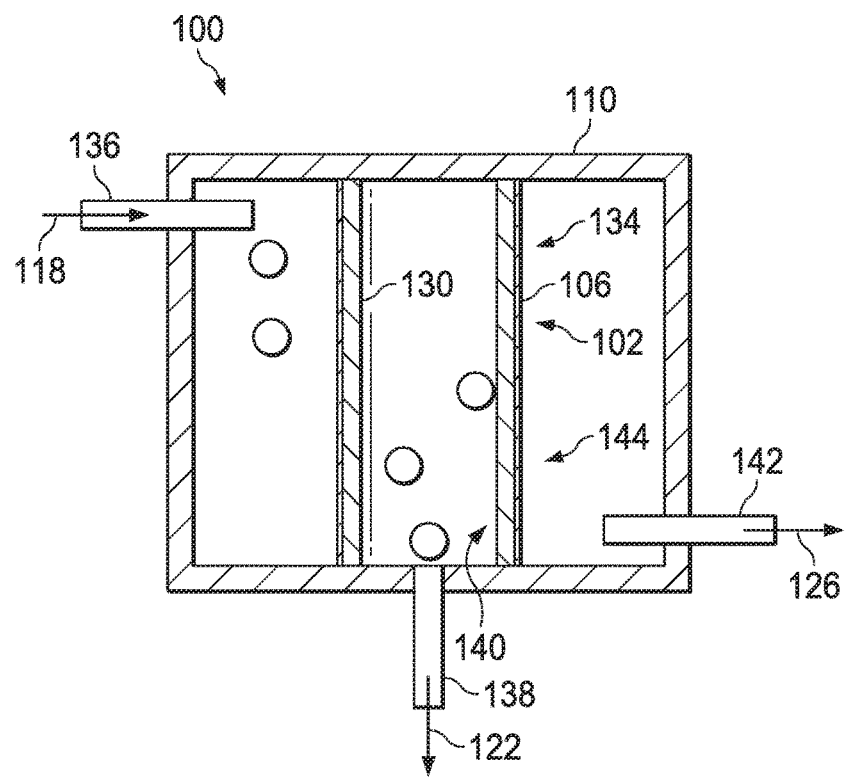
FIG. 1B is a cross-sectional schematic view of a membrane unit with a cylindrical membrane coated with graphene oxide in accordance with certain embodiments of the present disclosure.

The membrane may take the form of one or more cylindrical or wrapped (e.g., spiral) sheets. FIG. 1B illustrates a membrane unit 100 having a membrane 102 with a substrate 130 in the form of a porous sheet wrapped into a cylinder or spiral shape. The cylindrical or wrapped membrane may include the grapheme oxide coating 106 on a radially outward facing side 134 of the porous substrate 130, taken with respect to an axis about which the substrate 130 is wrapped.

In some embodiments, the substrate 130 may be wrapped once such that the membrane 102 forms a single cylindrical shape. In other embodiments, the substrate 130 may be wrapped multiple times in a spiral fashion around itself to provide multiple layers through which water permeates before exiting the membrane unit 100. The membrane unit 100 of FIG. 1B may include an inlet 136 to receive the fluid stream 118 into the membrane unit 100, a first outlet 138 in fluid communication with a radially inner side 140 (opposite the graphene oxide coating 106) of the membrane 102 to output the permeate 122, and a second outlet 142 in fluid communication with a radially outer side 144 (facing the graphene oxide coating 106) of the membrane 102 to output the retentate 126. Although not illustrated, the membrane unit 100 of FIG. 1B may include a stirring or agitation device similar to FIG. 1A on the fluid stream/retentate side 144 of the membrane 102.

Figure 1C:
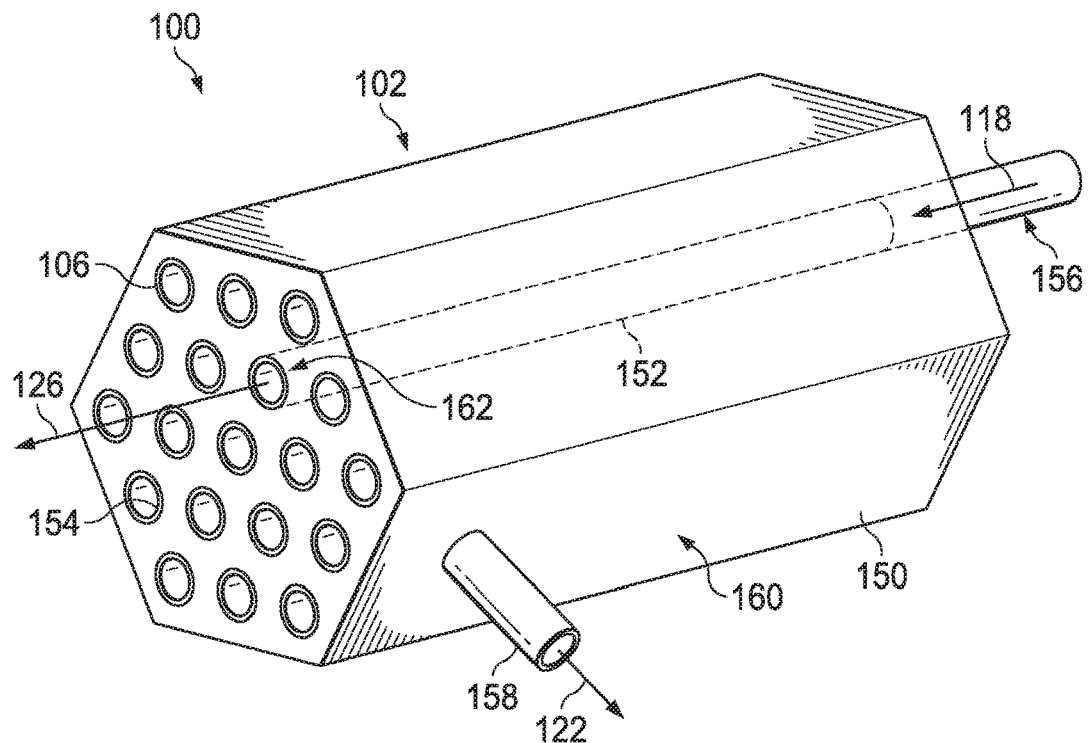
FIG. 1C is a perspective schematic view of a membrane unit with a porous tubular membrane coated with graphene oxide in accordance with certain embodiments of the present disclosure.

The membrane may take the form of a porous material having tubular shaped pathways extending therethrough, wherein the fluid stream flows through the pathways. FIG. 1C illustrates a membrane unit 100 having a membrane 102 with a substrate ISO in the form of a porous material with tubular pathways 152 formed therethrough. The graphene oxide 106 may be coated on a radially inner surface 154 of each of the tubular shaped pathways 152 within the porous membrane substrate 150. The membrane unit 100 of FIG. 1C may include an inlet 156 to receive the fluid stream 118 into the membrane unit 100, a first outlet 158 in fluid communication with an external side 160 (opposite the graphene oxide coating 106) of the membrane 102 to output the permeate 122, and a second outlet 162 in fluid communication with the inside of the tubular pathways 152 (facing the graphene oxide coating 106) of the membrane 102 to output the retentate 126. A pump coupled in fluid communication to the substrate 150 may provide backpressure through the tubular pathways 152.

Figure 1D:
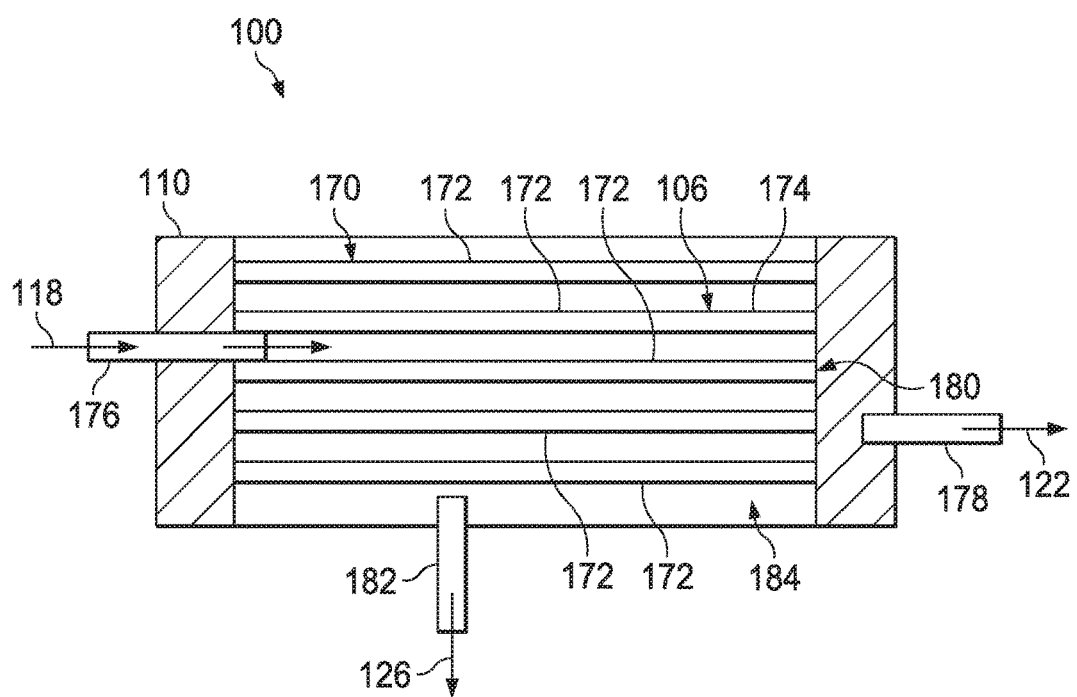
FIG. 1D is a partial cutaway schematic view of a membrane unit with a fiber bundle membrane coated with graphene oxide in accordance with certain embodiments of the present disclosure.

The membrane may take the form of a bundle of fibers arranged within a pressure chamber where the fluid stream flows through a space surrounding the fibers and the permeate exits through the fiber ends. FIG. 1D illustrates a membrane unit 100 having a membrane 102 with a substrate 170 in the form of a bundle of porous fibers 172. In such instances, the graphene oxide 106 may be coated on a radially external surface 174 of each of the porous fibers 172. The membrane unit 100 of FIG. 11) may include an inlet 176 to receive the fluid stream 118 into the membrane unit 100, a first outlet 178 in fluid communication with an end 180 of the one or more hollow fibers 172 (opposite the graphene oxide coating 106) of the membrane 102 to output the permeate 122, and a second outlet 182 in fluid communication with a radially external side 184 (facing the graphene oxide coating 106) of the membrane 102 to output the retentate 126. Although not illustrated, the membrane unit 100 of FIG. 1D may include a stirring or agitation device similar to FIG. 1A located external to the fibers 172 to keep the boundary refreshed.

Figure 1E:
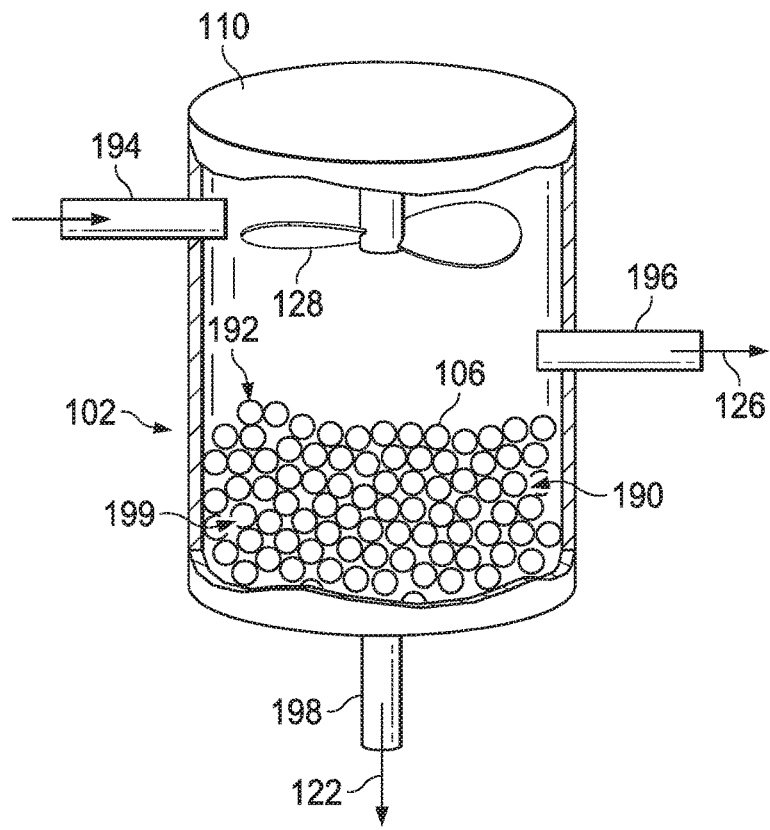
FIG. 1E is a partial cutaway schematic view of a membrane unit with a sand pack membrane coated with graphene oxide in accordance with certain embodiments of the present disclosure.

In an embodiment, the membrane may take the form of a sand pack filter device. FIG. 1E illustrates such an embodiment of the membrane unit 100. The membrane 102 may include a sand pack 190 formed by a collection of sand or other particulate 192 packed together. The sand pack 190 provides a porous membrane in that the spaces between the particles 192 forming the sand pack 190 function as pores through which water can flow. The sand pack 190 may separate one side of the membrane unit 100 having the inlet 194 and second (retentate) outlet 196 from an opposite side of the membrane unit 100 having the first (permeate) outlet 198. The sand or other particulate 192 within the membrane unit 100 may function as the membrane substrate 199 onto which the graphene oxide 106 is coated. In some embodiments, an external surface of each sand particle 192 may be coated with graphene oxide 106 to enhance the hydrophilic nature of the resulting sand pack membrane. In other embodiments, only an upper layer or portion of the sand particulate 192 within the sand pack 190 may be coated with graphene oxide 106. The permeability of the sand pack membrane may be tailored by choosing a desired particle size distribution of the graphene oxide coated particulate. As illustrated, the membrane unit 100 of FIG. 1E may include a stirring or agitation device 128 on the fluid stream/retentate side of the membrane 102 to keep the boundary of the sand pack 190 refreshed.

The substrates used in any of the above types of membranes may be constructed from, among other things, a polymer, ceramic, metal, or combination thereof. In embodiments where the membrane includes one or more flat, cylindrical, or wrapped sheets, the sheet substrates may be constructed from a polymer material such as, for example, polyethylene, polypropylene, urethane, nylon, polyamide, polytetrafluoroethylene (PTFE), polyvinylidene fluoride (PVDF), polyvinylchloride (PVC), cellulose acetate, cellulose esters, polyimide, polyacrylonitrile (PAN), polyether sulfone (PES), polysulfone (PS), or a combination thereof. In certain embodiments, the membrane may include a polymer substrate coated with graphene oxide, as available from G2O Water Technologies, Ltd. In embodiments where the membrane includes a porous material having tubular shaped pathways formed therethrough, the porous substrate may include a ceramic material such as, for example, alumina, titania, zirconia oxides, silicon carbide, glass, or a combination thereof. In embodiments wherein the membrane includes a bundle of fibers, each fiber substrate may include one or more sintered metals such as, for example, aluminum, titanium, stainless steel, bronze, copper, or a combination thereof.

In each of the embodiments of FIGS. 1A, 1B, 1C, 1D, 1E, the porous substrate of the membrane 102 may have a pore size corresponding to the size of one or more open cells or spaces formed in the porous substrate. In some embodiments, the open cells or spaces in the porous substrate may have roughly the same pore size throughout. In other embodiments, the pore sizes of the open cells or spaces in the porous substrate may be varied. In certain embodiments, the porous substrate may have a pore size of less than about 10 micron, or alternatively less than about 5 micron, or alternatively, less than about 1 micron. In some embodiments the pore sizes within the porous substrate of the membrane may have a multi-modal distribution, where certain cells or spaces have a first smaller pore size and other cells or spaces have a second larger pore size.

In the following figures (FIGS. 2-7) of this application, the membrane unit 100 is generally illustrated as having a cylindrical substrate 130 (as shown in FIG. 1B). However, it should be understood that any of the above embodiments of the membrane unit 100 (as described with reference to FIGS. 1A, 1C, 1D, and/or 1E) may be used as well.

Figure 2:
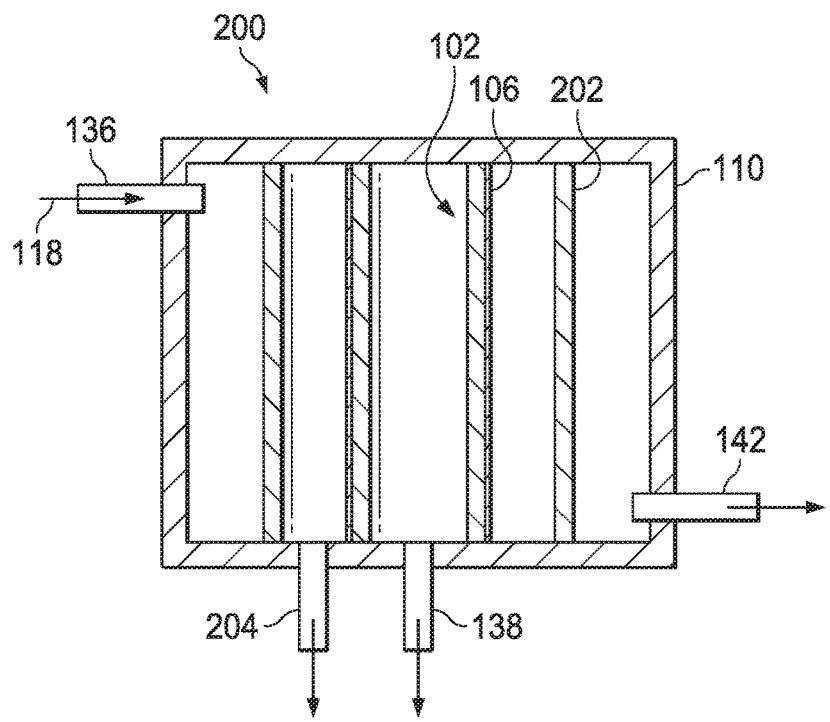
FIG. 2 is a cross-sectional schematic view of another membrane unit in accordance with certain embodiments of the present disclosure.

In some embodiments, a membrane unit may include a second membrane in addition to the membrane 102 coated with graphene oxide 106. In some embodiments, the second membrane 202 may be hydrophobic. FIG. 2 illustrates an embodiment of the membrane unit 200 that includes a second membrane 202 along with the membrane 102 described above. Including both the graphene oxide coated membrane 102 and the second membrane 202 within the same membrane unit 200 enables the membrane unit 200 to produce oil, water, and solids separation without using mechanical action. For example, the second membrane 202 may separate oil and/or solids from the water-entrenched brine, and the graphene oxide coated membrane 102 may separate the water from the brine. The second membrane 202 may allow the water entrenched brine to pass through the second membrane 202, and the separated solids and/or oil may be output via outlet 142. The graphene oxide coated membrane 102 may separate the water from the brine, outputting the water through outlet 138 and the higher density brine through outlet 204. This membrane unit 200 may similarly be used as a passive polishing unit for brine reclamation by separating both water and oil from a brine using a single membrane unit 200.

Having now described various embodiments of the membrane unit 100 having a graphene oxide coated membrane that may be used to treat recovered well fluids, more detailed descriptions will be provided of the processes and systems used to treat various well fluids.

Graphene Oxide Coated Membrane for Completion Fluid Density Management

The membrane unit 100 including a graphene oxide coated membrane may be utilized in the cleanup and conditioning of brines from recovered completion fluids. After solid materials contaminating used brines have been filtered out from the recovered completion fluid, the brine may have a reduced density due to water introduced to the fluid during the wellbore cleanup process; the water may have been drawn out of the formation, for example, while managing pressure downhole via the brine-based completion fluid. In some cases, the usefulness of the brine may be compromised due to the changes in density. The disclosed systems and methods use the graphene oxide coated membrane to separate fresh water from recovered brines to control brine density for storage and future use.

The graphene oxide coated membrane described above may have a performance advantage in separating water from brine over existing membrane technologies, due to the hydrophilic nature of the graphene oxide coating. The graphene oxide coated membrane may be particularly useful in treating very high density brines. Such very high density (heavy) brines may include, for example, potassium formate, cesium formate, zinc bromide, calcium bromide calcium chloride, and the like. These high density brines are expensive and can be only be purchased from limited vendors. As such, it may be desirable to recover and reuse as much of these heavy brines as possible during completion operations. The disclosed systems and methods allow for the treatment of such brines, which might not otherwise be treatable to increase brine density. Managing brine-based completion fluid volumes and density may have a large impact on the economics of completion fluid operations, since there is a lower cost for disposal of brines, lower total cost of the brines since they can be reused, and lower cost of storage since the density can be increased without also increasing brine volume.

Figure 3:
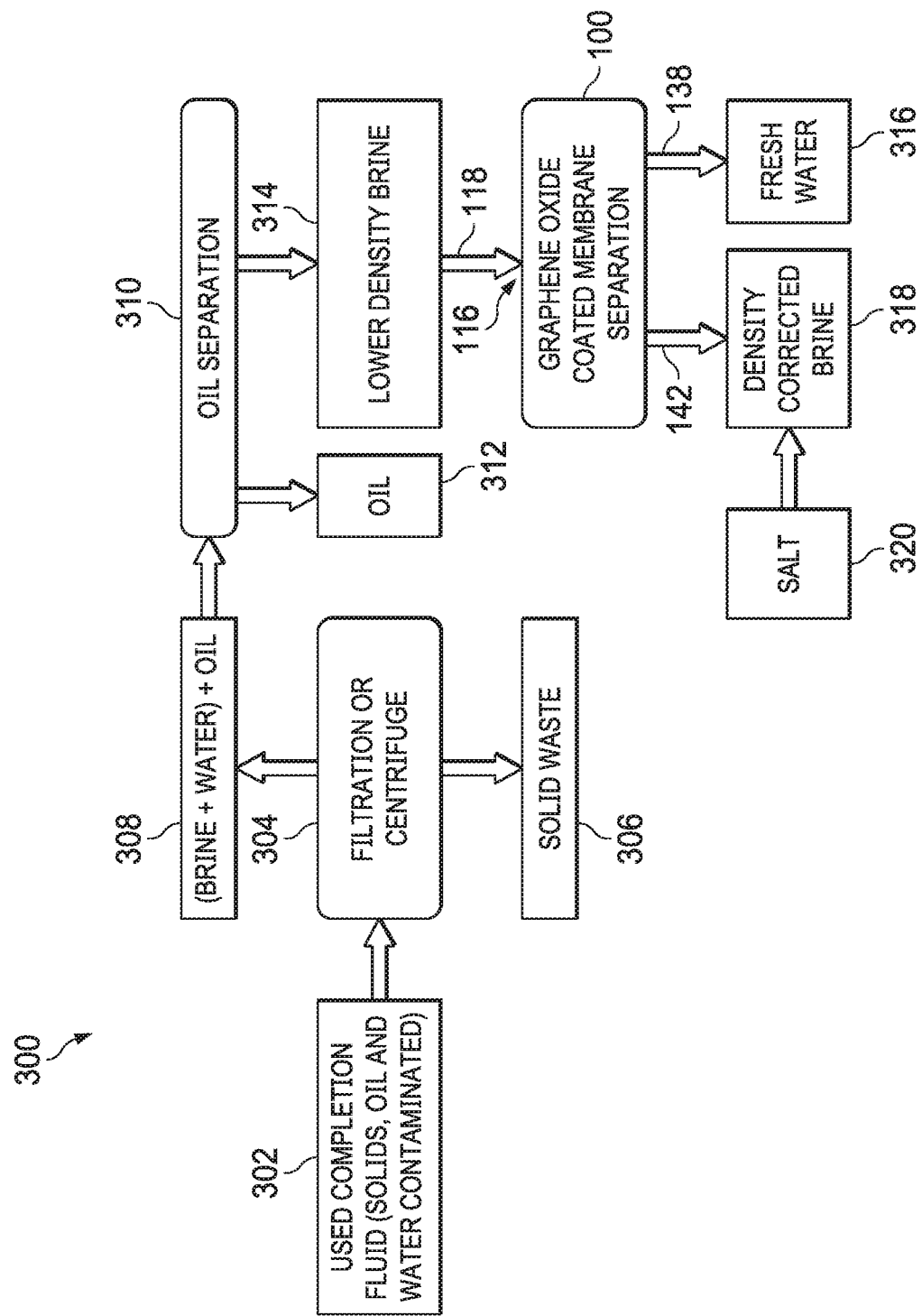
FIG. 3 is a process flow diagram illustrating a method for controlling brine density of recovered completion fluid in accordance with certain embodiments of the present disclosure.

FIG. 3 illustrates a schematic flow diagram of a completion fluid treatment process 300 in accordance with the present disclosure. The process 300 involves treating used completion fluid from a well to recover and advantageously control the density and volume of brine using the graphene oxide coated membrane unit 100. The process 30) includes a number of different pretreatment processes used to pretreat a completion fluid recovered from the well before the fluid is transferred to the membrane unit 100 for separation of additional water from the brine. Although certain pretreatment processes are shown in FIG. 3, any desired combination of one or more pretreatment processes (e.g., centrifugation, filtering, dissolved air flotation, UV, chemical such as oxidizers, enzymes, electrophoretic methods, etc.) may be performed using one or more pretreatment units to initially condition the recovered fluid.

The process 300 begins with a recovered brine-based completion fluid 302 contaminated by solids, oil, and water. The contaminated brine 302 may be filtered or centrifuged 304. One portion of the contaminated material separated via the filter or centrifuge is removed solids waste 306. The other portion is a combination of brine, water, and oil 308. This portion 308 may be sent to an oil separation unit 310, which removes oil 312 from water-contaminated brine 314. The water-contaminated brine 314 has a lower density than the brine that used in the initial completion fluid before the completion fluid was introduced to the well. The water-contaminated brine 314 may be treated using the graphene oxide coated membrane unit 100 to remove excess water 316 from the brine. The water-contaminated brine 314 is received as the fluid stream at the inlet 116 of the membrane unit 100. The membrane unit 100 may produce both the fresh water stream 316 and an increased density brine stream 318. The water 316 is output from the membrane unit 100 via the first outlet 138, while the increased density brine 318 is output via the second outlet 142. The brine 318 output from the membrane unit 100 may have a higher density than the water-contaminated brine 314 that was initially received at the inlet of the membrane unit 100. The brine 318 output from the membrane unit 100 may have a density of from about 8.3 lb/gal to about 21 lb/gal, or alternatively, from about 9.6 lb/gal to about 19.2 lb/gal, or alternatively, from about 11.6 lb/gal to about 19.2 lb/gal. The density of the brine 318 output from the membrane unit 100 may be affected by the type of salt and concentration of the salt. For example, the brine density may be about 9.6 lb/gal for NaCl brine, about 11.6 lb/gal for $CaCl_2$) brine, 15.6 lb/gal for $CaBr_2$ brine, and up to 19.2 lb/gal for some mixed brines including, for example, $CaCl_2$, $CaBr_2$, and $ZnBr_2$. Disclosed methods may include reusing the brine 318 output from the membrane or storing the brine 318 output from the membrane for later reuse.

In some embodiments, the brine 318 output from the membrane unit 100 may be approximately equal to an original brine density of the initial completion fluid before it was introduced to the well. As such, the membrane unit 100 may restore the brine density to a desired amount without any addition of salt that could lead to an undesired increase in volume. In certain embodiments, a portion of the initial brine introduced to the well may be lost during the wellbore cleanup and treatment processes. In such instances, a combination of adding salt 320 and removing water via the membrane unit 100 may be used to provide a desired density and volume of the resulting brine. Thus, both brine density and volume may be managed.

Figure 4:
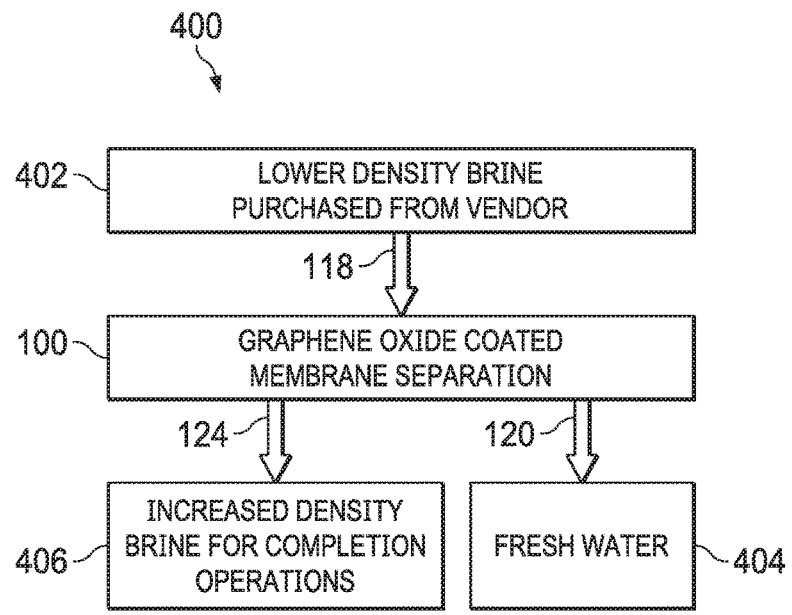
FIG. 4 is a process flow diagram illustrating a method for conditioning low density brine to high density brine in accordance with certain embodiments of the present disclosure.

The membrane unit 100 having a graphene oxide coated membrane may also be used to control brine density and volume before even introducing the brine to the well. Using the membrane unit 100 to condition brine-based completion fluids prior to introducing the fluids downhole may enable significant cost savings. FIG. 4 illustrates one such process 400 for controlling brine density and volume before introducing the brine downhole. A customer may purchase a relatively inexpensive, lower density brine 402 from a vendor and treat the brine using the membrane unit 100 to remove excess water 404 from the brine, thereby producing a higher density brine 406 for use in well completions. This higher density brine 406 may have otherwise cost more than the original brine 402 if purchased directly from the vendor. Using the membrane unit 100 to treat completion fluids prior to introduction of the fluids to the wellbore may also enable fine-tuning and conditioning of the density and volume of brine for use downhole.

Graphene Oxide Coated Membrane for Slop Water Treatment

The membrane unit 100 including a graphene oxide coated membrane may be utilized in the cleanup and disposal of slop water at offshore rigs. Managing slop water at the rig location may be desirable as it reduces the cost and environmental impact associated with transporting large vessels carrying slop water from the rig to the shore for treatment and disposal. The present disclosure provides systems and methods using the graphene oxide coated membrane to separate clean, possibly potable water from the slop water, thereby enabling discharge of the clean water to the environment or reuse of the clean water in pit washing operations. The amount of water that is clean enough to be discharged to the environment or reused for other purposes may be greater than the amount of water that could otherwise be cleaned without the graphene oxide coated membrane unit.

Figure 5:
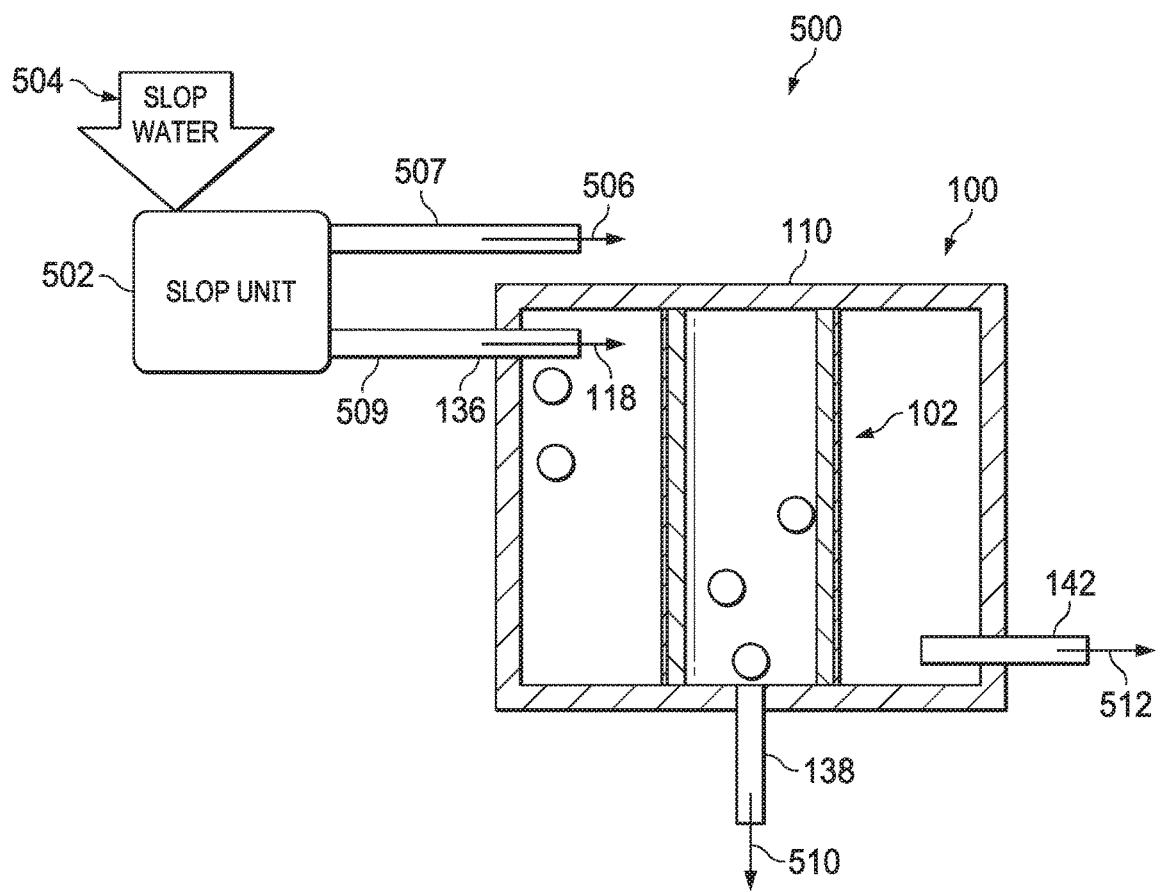
FIG. 5 is a diagram illustrating an example of a treatment system treating slop water in accordance with certain embodiments of the present disclosure.
Figure 6:
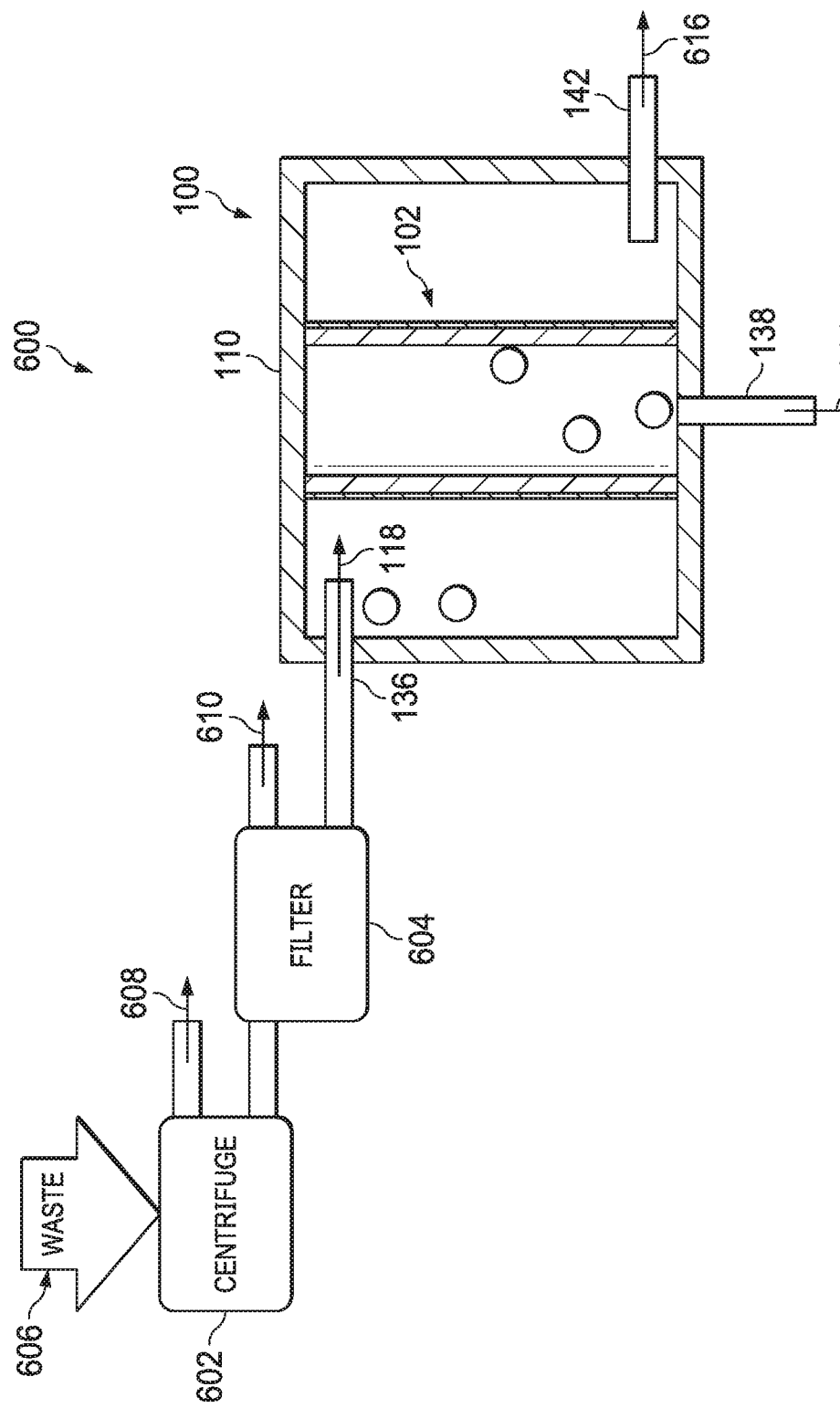
FIG. 6 is a diagram illustrating another example of a treatment system treating slop water in accordance with certain embodiments of the present disclosure.

FIGS. 5 and 6 illustrate two embodiments of slop water treatment systems 500 and 600, respectively, in accordance with the present disclosure. Both treatment systems 500 and 600 include one or more pretreatment units used to pretreat the slop water recovered from the rig before the fluid is transferred to the membrane unit 100 for separation of clean water from its contaminants. Although certain pretreatment processes are shown in FIGS. 5 and 6, any desired combination of one or more pretreatment processes (e.g., centrifugation, filtering, dissolved air flotation, UV, chemical such as oxidizers, enzymes, electrophoretic methods, etc.) may be performed using one or more pretreatment units to initially condition the slop water.

In FIG. 5, the slop water treatment system 500 may include, among other things, a dissolved air flotation (DAF) unit 502 and the membrane unit 100. The DAF unit 502 may include a slop treatment unit such as BARAH2O™ (slop treatment unit, available from Halliburton Energy Services, Inc.). The DAF unit 502 may be modular and highly efficient for treating oily water stop produced on an offshore rig. The DAF unit 502 and membrane unit 100 may both be located at the offshore rig site. The DAF unit 502 may utilize a combination of chemical treatment and DAF to treat incoming slop water 504 and output oils and solids 506 via a first outlet 507 separate from contaminated water in a second outlet 509. The contaminated water may be provided as the input fluid stream 118 to the inlet 136 of the membrane unit 100. The membrane unit 100 may further separate clean water 510 from leftover contaminants 512 such as oils. The clean water 510 may be output through the first outlet 138 while the contaminants 512 are output from the second outlet 142. In some embodiments, the clean water 510 output from the membrane unit 100 may be potable. Disclosed methods may include reusing the clean water 510 output from the membrane or disposing of the water 510 by discharging the water 510 to the environment at the offshore rig.

Using the fluid treatment system 500 of FIG. 5, the effectiveness of the DAF unit 502 may be enhanced via the additional water treatment using the graphene oxide coated membrane unit 100. As regulations become more restrictive, the effluent from the dissolved hydrocarbons in the slop water may be too high to be discharged from the well. As such, the graphene oxide coated membrane unit 100 may reduce hydrocarbon content in the water to the point that the water is suitable for discharge to the environment even under stringent discharge regulations.

In FIG. 6, the slop water treatment system 600 may include, among other things, a centrifuge 602, a solids filter 604, and the membrane unit 100. The centrifuge 602, filter 604, and membrane unit 100 may all be located at the offshore rig site. The centrifuge 602 may treat incoming slop water 606 to separate out oils 608. Then the remaining fluid stream may be received at the filter 604 and filtered to separate solids 610 from contaminated water. The contaminated water may be provided as the input fluid stream 118 to the inlet 116 of the membrane unit 100. The membrane unit 100 may further separate clean water 614 from leftover contaminants 616 such as oils. The clean water 614 may be output through the first outlet 138 while the contaminants 616 are output from the second outlet 142. In some embodiments, the clean water 614 output from the membrane unit 100 may be potable. Using the fluid treatment system 600 of FIG. 6, the graphene oxide coated membrane unit 100 may reduce hydrocarbon content in the water to the point that the water is suitable for discharge to the environment even under stringent discharge regulations. Disclosed methods may include reusing the clean water 614 output from the membrane or disposing of the water 614 by discharging the water 614 to the environment at the offshore rig.

Graphene Oxide Coated Membrane for Fracturing Fluid Treatment

The membrane unit 100 including a graphene oxide coated membrane may be utilized in the cleanup and disposal of fracturing fluid at well sites. Managing used fracturing fluid at the well may be desirable as it reduces costs associated with disposal of the fluid. The present disclosure provides systems and methods using the graphene oxide coated membrane to separate clean, possibly potable water from the fracturing fluid, thereby enabling discharge of water to the environment or reuse of the clean water for fracturing or other well operations. The amount of water that is clean enough to be discharged to the environment or reused may be greater than the amount of water that could otherwise be cleaned without the graphene oxide coated membrane unit.

Figure 7:
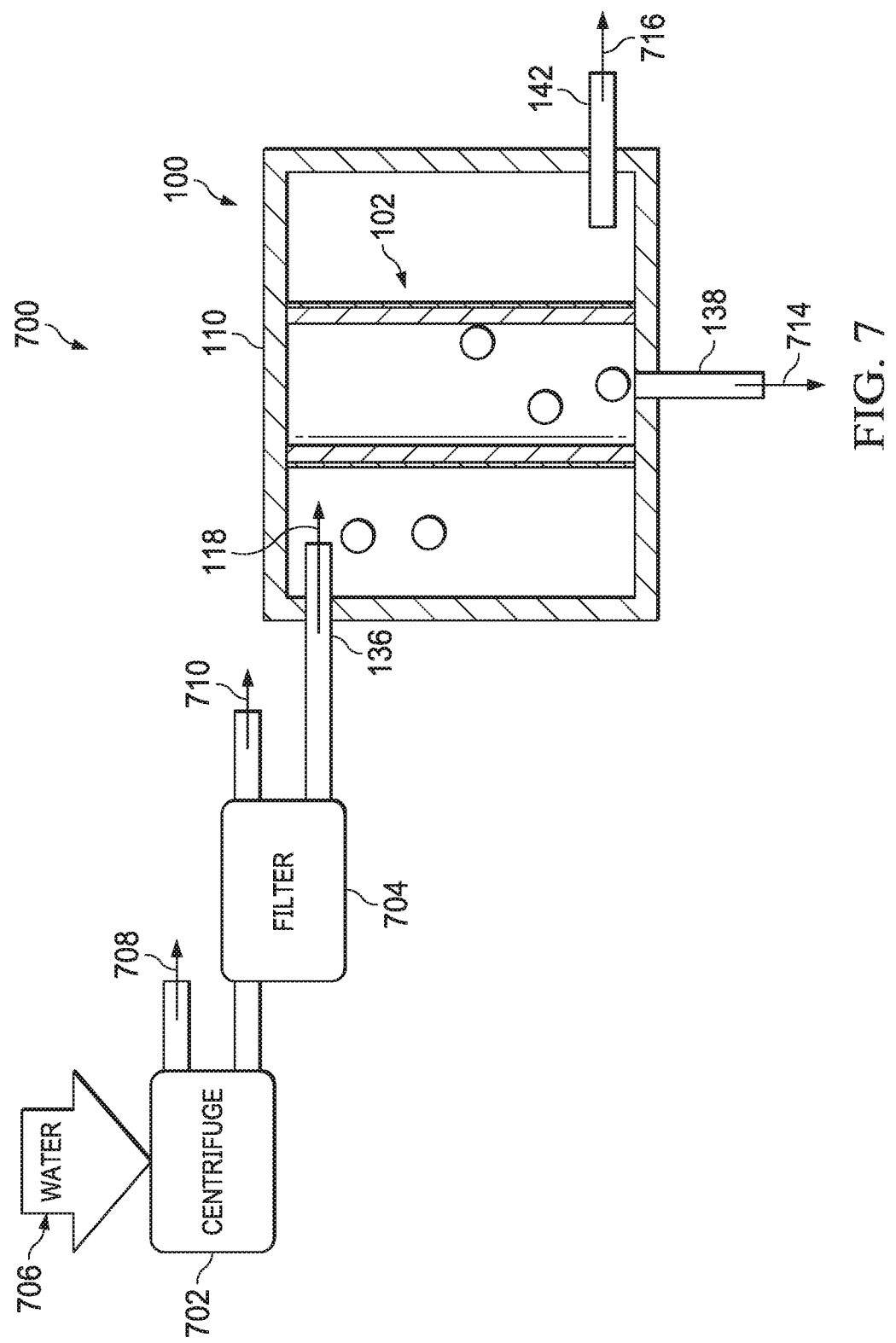
FIG. 7 is a diagram illustrating an example of a treatment system treating fracturing fluid in accordance with certain embodiments of the present disclosure.

FIG. 7 illustrates an embodiment of a fracturing fluid treatment system 700 in accordance with the present disclosure. The fracturing fluid treatment system 700 may include one or more pretreatment units used to pretreat the fracturing fluid recovered from the rig before the fluid is transferred to the membrane unit 100 for separation of clean water from its contaminants. Although certain pretreatment processes are shown in FIG. 7, any desired combination of one or more pretreatment processes (e.g., centrifugation, filtering, dissolved air flotation, UV, chemical such as oxidizers, enzymes, electrophoretic methods, etc.) may be performed using one or more pretreatment units to initially condition the recovered fluid.

The fracturing fluid treatment system 700 of FIG. 7 may include, among other things, a centrifuge 702, a solids filter 704, and the membrane unit 100. The centrifuge 702 may treat incoming used fracturing fluid 706 to separate out oils 708. Then the remaining fluid stream may be received at the filter 704 and filtered to separate solids 710 from contaminated water. The contaminated water may be provided as the input fluid stream 118 to the inlet 116 of the membrane unit 100. The membrane unit 100 may further separate clean water 714 from residual contaminants 716. The clean water 714 may be output through the first outlet 138 while the contaminants 716 are output from the second outlet 142. In some embodiments, the clean water 714 output from the membrane unit 100 may be potable. Using the fluid treatment system 700 of FIG. 7, the graphene oxide coated membrane unit 100 may reduce hydrocarbon content in the water to the point that the water is suitable for discharge to the environment and permitted for reuse even under stringent regulations. Disclosed methods may include reusing the clean water 714 output from the membrane or disposing of the water 714 by discharging the water 714 to the environment.

The fluids recovered from the well and treated using the methods and systems of the present disclosure may include any aqueous base fluid known in the art. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension as desired. In certain embodiments, the pH of the aqueous fluid may be adjusted (e.g., by a buffer or other pH adjusting agent) to a specific level, which may depend on, among other factors, the types of viscosifying agents, acids, and other additives included in the fluid.

In certain embodiments, the fluids recovered from the well and treated using the methods and systems of the present disclosure optionally may include any number of additional additives. Examples of such additional additives include, but are not limited to, salts, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the fluid may contain rheology (viscosity and gel strength) modifiers and stabilizers.

The present disclosure in some embodiments provides methods for treating aqueous fluids that are recovered from the well after carrying out a variety of subterranean treatments, including but not limited to, drilling operations, completion operations, hydraulic fracturing treatments, and acidizing treatments. In some embodiments, the methods of the present disclosure may include recovering at least a portion of the treatment fluid from the well and treating the recovered fluid using one or more fluid treatment operations. In the present disclosure, at least one of the fluid treatment operations includes separating water from another portion of the treatment fluid using a graphene oxide coated membrane. In some embodiments, the fluid treatment operations include one or more pretreatment operations performed by one or more pretreatment units on the treatment fluid before the water separation using the graphene oxide coated membrane. The pretreatment operations may include, among other things, one or more processes of centrifugation, solids filtering, dissolved air flotation, UV operations, application of chemicals such as oxidizers, application of enzymes, and electrophoretic methods, among others. The fluid pretreatment unit(s) may include, but are not limited to, one or more of a shaker (e.g., shale shaker), a centrifuge, a hydrocyclone, a separator (including magnetic and electrical separators), a DAF unit, a desilter, a desander, a separator, a filter (e.g., diatomaceous earth filters), a heat exchanger, fluid reclamation equipment, and the like. The fluid pretreatment unit(s) may further include one or more sensors, gauges, pumps, compressors, and the like used to store, monitor, regulate, and/or recondition the fluids.

Figure 8:
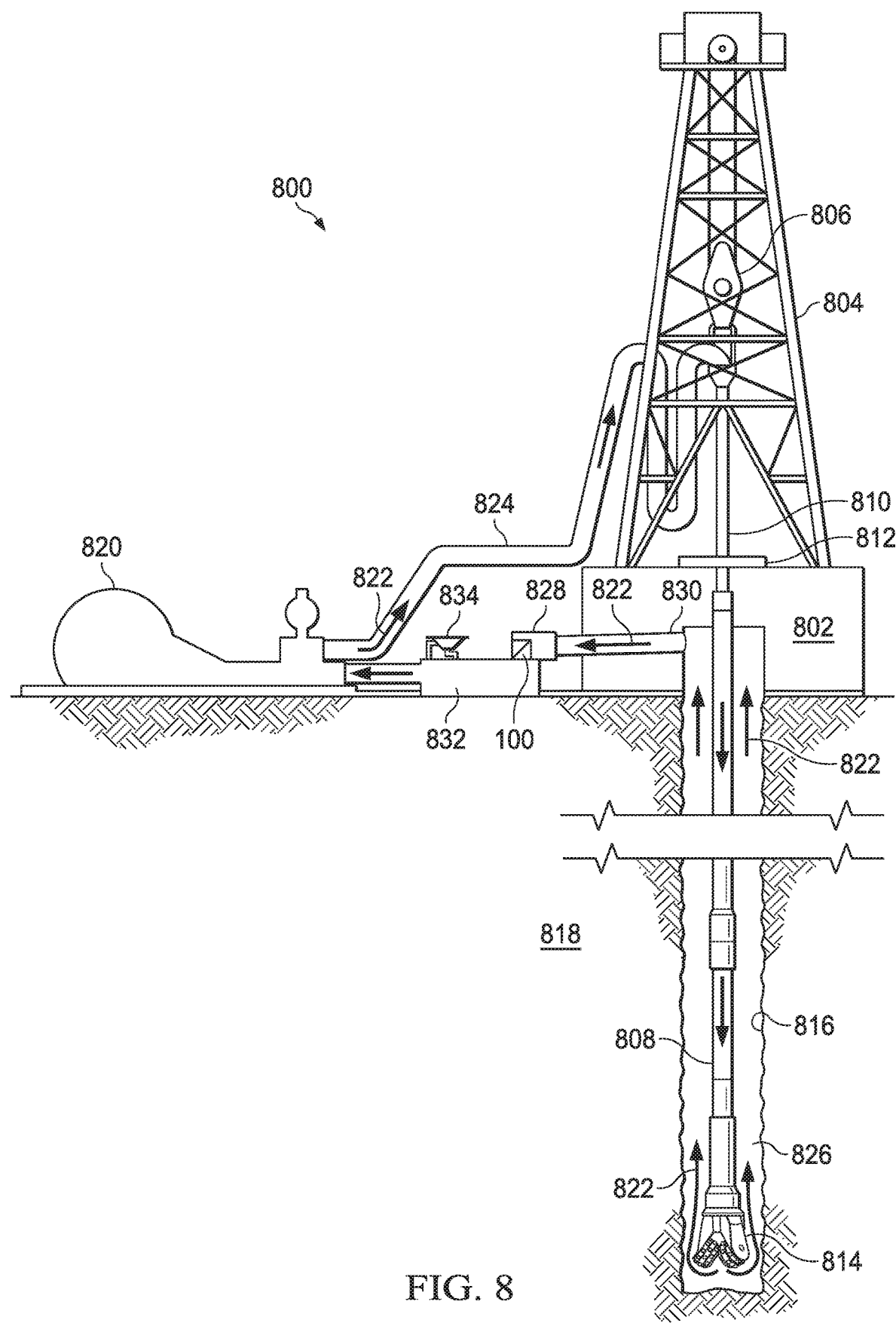
FIG. 8 is a diagram illustrating an example of a wellbore drilling assembly that may be used in accordance with certain embodiments of the present disclosure.

The fluid treatment systems and methods of the present disclosure may directly or indirectly affect one or more components or pieces of equipment associated with the preparation, delivery, recapture, recycling, reuse, and/or disposal of the treatment fluids of the present disclosure. For example, the fluid treatment systems and methods may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the fluids treated by the present disclosure. The fluid treatment systems and methods of the present disclosure may also directly or indirectly affect any transport or delivery equipment used to convey the treated fluid to or from a well site or downhole such as, for example, any transport vessels, conduits, pipelines, trucks, tubulars, and/or pipes used to move fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, and/or combinations thereof, and the like. For example, and with reference to FIG. 8, the disclosed fluid treatment systems and methods may directly or indirectly affect one or more components or pieces of equipment associated with an example of a wellbore drilling assembly 800, according to one or more embodiments. It should be noted that while FIG. 8 generally depicts a land-based drilling assembly, those skilled in the art will readily recognize that the principles described herein are equally applicable to subsea drilling operations that employ floating or sea-based platforms and rigs (particularly for treating slop water offshore) without departing from the scope of the disclosure. It should also be noted that while FIG. 8 generally depicts a drilling operation, those skilled in the art will readily recognize that the disclosed fluid treatment systems and methods may be similarly applied during completion and stimulation operations.

As illustrated, the drilling assembly 800 may include a drilling platform 802 that supports a derrick 804 having a traveling block 806 for raising and lowering a drill string 808. The drill string 808 may include, but is not limited to, drill pipe and coiled tubing, as generally known to those skilled in the art. A kelly 810 supports the drill string 808 as it is lowered through a rotary table 812. A drill bit 814 is attached to the distal end of the drill string 808 and is driven either by a downhole motor and/or via rotation of the drill string 808 from the well surface. As the bit 814 rotates, it creates a borehole 816 that penetrates various subterranean formations 818.

A pump 820 (e.g., a mud pump) circulates drilling fluid 822 through a feed pipe 824 and to the kelly 810, which conveys the drilling fluid 822 downhole through the interior of the drill string 808 and through one or more orifices in the drill bit 814. The drilling fluid 822 is then circulated back to the surface via an annulus 826 defined between the drill string 808 and the walls of the borehole 816. At the surface, the recirculated or spent drilling fluid 822 exits the annulus 826 and may be conveyed to one or more fluid processing unit(s) 828 via an interconnecting flow line 830. The one or more fluid processing unit(s) 828 may include one or more pretreatment units and the membrane unit 100 of the present disclosure. After passing through the fluid processing unit(s) 828, a "cleaned" drilling fluid 822 is deposited into a nearby retention pit 832 (i.e., a mud pit). This cleaned drilling fluid 822 may include, for example, a higher percentage of water than drilling fluid that is cleaned without the graphene oxide coated membrane unit 100. While illustrated as being arranged at the outlet of the wellbore 816 via the annulus 826, those skilled in the art will readily appreciate that the fluid processing unit(s) 828 may be arranged at any other location in the drilling assembly 800 to facilitate its proper function, without departing from the scope of the disclosure. In certain embodiments, such as those using fluid processing unit(s) 828 to condition brine-based completion fluids, certain fluid processing unit(s) 828 may be located at a mud plant remote from the well location.

One or more additives may be added to the drilling fluid 822 via a mixing hopper 834 communicably coupled to or otherwise in fluid communication with the retention pit 832. The mixing hopper 834 may include, but is not limited to, mixers and related mixing equipment known to those skilled in the art. In other embodiments, however, additives may be added to the drilling fluid 822 at any other location in the drilling assembly 800. In at least one embodiment, for example, there could be more than one retention pit 832, such as multiple retention pits 832 in series. Moreover, the retention pit 832 may be representative of one or more fluid storage facilities and/or units where recovered well fluids may be stored, reconditioned, and/or regulated until added to the drilling fluid 822.

As mentioned above, the disclosed fluid treatment systems and methods may directly or indirectly affect the components and equipment of the drilling assembly 800 by efficiently separating water from recovered well fluids. For example, the treated well fluids may directly or indirectly affect one or more components of the fluid processing unit(s) 828 including, but not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, additional fluid reclamation equipment, and the like.

The disclosed fluid treatment systems and methods may directly or indirectly affect the pump 820, which representatively includes any conduits, pipelines, trucks, tubulars, and/or pipes used to fluidically convey recycled well fluids downhole, any pumps, compressors, or motors (e.g., topside or downhole) used to drive the treated fluids into motion, any valves or related joints used to regulate the pressure or flow rate of the treated fluids, and any sensors (i.e., pressure, temperature, flow rate, etc.), gauges, and/or combinations thereof, and the like. The disclosed fluid treatment systems and methods may also directly or indirectly affect the mixing hopper 834 and the retention pit 832 and their assorted variations.

The disclosed fluid treatment systems and methods may also directly or indirectly affect various downhole equipment and tools that may come into contact with recycled or reconditioned fluids such as, but not limited to, the drill string 808, any floats, drill collars, mud motors, downhole motors and/or pumps associated with the drill string 808, and any MWD/LWD tools and related telemetry equipment, sensors or distributed sensors associated with the drill string 808. The disclosed fluid treatment systems and methods may also directly or indirectly affect any downhole heat exchangers, valves and corresponding actuation devices, tool seals, packers and other wellbore isolation devices or components, and the like associated with the wellbore 816. The disclosed fluid treatment systems and methods may also directly or indirectly affect the drill bit 814, which may include, but is not limited to, roller cone bits, PDC bits, natural diamond bits, hole openers, reamers, coring bits, etc.

While not specifically illustrated herein, the disclosed fluid treatment systems and methods may also directly or indirectly affect transport or delivery equipment used to convey the treated fluids to or from the drilling assembly 800 such as, for example, any transport vessels, conduits, pipelines, trucks, tubulars, and/or pipes used to fluidically move the fluids from one location to another, any pumps, compressors, or motors used to drive the treated fluids into motion, any valves or related joints used to regulate the pressure or flow rate of the treated fluids, and any sensors (i.e., pressure and temperature), gauges, and/or combinations thereof, and the like. The disclosed fluid treatment systems and methods may also directly or indirectly affect disposal equipment used to dispose of the treated fluids at the well location, including equipment for releasing or pumping clean water into the environment.

An embodiment of the present disclosure is a fluid treatment system for treating a completion fluid, a fracturing fluid, or slop water, the fluid treatment system including: a membrane unit. The membrane unit includes: an inlet for receiving a fluid stream into the membrane unit; a first membrane including a porous substrate at least partially coated with graphene oxide, wherein the first membrane separates a first portion of the fluid stream from a second portion of the fluid stream, wherein the first portion of the fluid stream includes water; a first outlet on a first side of the first membrane; and a second outlet on a second side of the first membrane opposite the first side.

In one or more embodiments described in the preceding paragraph, the porous substrate includes a material selected from the group consisting of: sintered metal, porous ceramic, and a polymer sheet. In one or more embodiments described in the preceding paragraph, the porous substrate includes a plurality of sand particles arranged as a sand pack, and the sand particles are coated with the graphene oxide. In one or more embodiments described in the preceding paragraph, the membrane unit further includes a second membrane within the membrane unit, wherein the second membrane is hydrophobic. In one or more embodiments described in the preceding paragraph, the fluid treatment system further includes at least one pretreatment component disposed upstream of the membrane unit, wherein the at least one pretreatment component receives the completion fluid, fracturing fluid, or slop water and outputs a pretreated fluid stream to the membrane unit. In one or more embodiments described in the preceding paragraph, the at least one pretreatment component includes a centrifuge, a solids filter, or both. In one or more embodiments described in the preceding paragraph, the at least one pretreatment component further includes an oil separator unit disposed downstream of the centrifuge, solids, filter, or both. In one or more embodiments described in the preceding paragraph, the at least one pretreatment component includes a dissolved air flotation (DAF) unit. In one or more embodiments described in the preceding paragraph, the membrane unit further includes a stirring component disposed therein on the second side of the first membrane.

Another embodiment of the present disclosure is a method for treating a used fluid recovered from a well, the method including: receiving the fluid recovered from the well at a pretreatment unit, wherein the fluid recovered from the well includes a completion fluid, a fracturing fluid, or slop water; pretreating the fluid recovered from the well via at least one pretreatment unit to generate a pretreated fluid stream; receiving the pretreated fluid stream into a membrane unit via an inlet of the membrane unit; contacting the pretreated fluid stream with a first membrane of the membrane unit, the first membrane comprising a porous substrate at least partially coated with graphene oxide; separating a first portion of the pretreated fluid stream from a second portion of the pretreated fluid stream via the first membrane, wherein the first portion of the pretreated fluid stream includes water; outputting the first portion of the pretreated fluid stream via a first outlet of the membrane unit; and outputting the second portion of the pretreated fluid stream via a second outlet of the membrane unit.

In one or more embodiments described in the preceding paragraph, the porous substrate includes a material construction selected from the group consisting of: sintered metal, porous ceramic, a polymer sheet, a bundle of fibers, and a sand pack. In one or more embodiments described in the preceding paragraph, the method further includes separating a third portion of the pretreated fluid stream from the first and second portions of the fluid stream via a second membrane within the membrane unit, the second membrane is hydrophobic, and the third portion includes oil. In one or more embodiments described in the preceding paragraph, the fluid recovered from the well is completion fluid, the pretreated fluid stream is a first brine, the first portion of the pretreated fluid stream is fresh water, and the second portion of the pretreated fluid stream is a second brine, the second brine having a higher density than the first brine. In one or more embodiments described in the preceding paragraph, pretreating the fluid recovered from the well includes: removing solid waste from the completion fluid via a centrifuge, a solids filter, or both to generate a brine-water-oil mixture; and separating oil from the brine-water-oil mixture via an oil separation unit to generate the pretreated fluid stream. In one or more embodiments described in the preceding paragraph, the method further includes: adding salt to the second brine to generate a third brine having a higher density than the second brine; and storing the third brine for reuse. In one or more embodiments described in the preceding paragraph, the pretreated fluid stream is pretreated water with contaminants, and wherein the first portion of the pretreated fluid stream is potable water. In one or more embodiments described in the preceding paragraph, pretreating the fluid recovered from the well includes removing oil and solid waste via a centrifuge, a solids filter, or both to generate the pretreated fluid stream. In one or more embodiments described in the preceding paragraph, the fluid recovered from the well is fracturing fluid. In one or more embodiments described in the preceding paragraph, the fluid recovered from the well is slop water. In one or more embodiments described in the preceding paragraph, pretreating the fluid recovered from the well includes removing oil and solid waste from the slop water via a dissolved air flotation (DAF) unit to generate the pretreated fluid stream.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A fluid treatment system for treating a brine-based fluid cycled through a well to maintain well pressure during wellbore operations, the fluid treatment system comprising:

at least one pretreatment component disposed upstream of a membrane unit, wherein the at least one pretreatment component receives the brine-based fluid, and separates solids, oil, or a combination thereof from the brine-based fluid to output a pretreated fluid stream; and the membrane unit, wherein the membrane unit comprises:
- an inlet for receiving the pretreated fluid stream into the membrane unit;
- a first membrane comprising a porous substrate at least partially coated with graphene oxide, wherein the first membrane separates a first portion of the pretreated fluid stream from a second portion of the pretreated fluid stream, wherein the first portion of the pretreated fluid stream comprises water;
- a first outlet on a first side of the first membrane; and
- a second outlet on a second side of the first membrane opposite the first side, wherein the pretreated fluid stream is a first brine, wherein the first portion of the pretreated fluid stream is fresh water, and wherein the second portion of the pretreated fluid stream is a second brine, the second brine having a higher density than the first brine, wherein the higher density is in a range of from about 8.3 to 21 pounds per gallon.

2. The fluid treatment system of claim 1, wherein the porous substrate comprises a material selected from the group consisting of: sintered metal, porous ceramic, and a polymer sheet.

3. The fluid treatment system of claim 1, wherein the porous substrate comprises a plurality of sand particles arranged as a sand pack, wherein the sand particles are coated with the graphene oxide.

4. The fluid treatment system of claim 1, wherein the membrane unit further comprises a second membrane within the membrane unit, wherein the second membrane is hydrophobic.

5. The fluid treatment system of claim 1, wherein the at least one pretreatment component comprises a centrifuge, a solids filter, or both.

6. The fluid treatment system of claim 5, wherein the at least one pretreatment component further comprises an oil separator unit disposed downstream of the centrifuge, solids, filter, or both.

7. The fluid treatment system of claim 1, wherein the at least one pretreatment component comprises a dissolved air flotation (DAF) unit.

8. The fluid treatment system of claim 1, wherein the membrane unit further comprises a stirring component disposed therein on the second side of the first membrane.

9. A method for treating a used fluid recovered from a well, the method comprising:
- cycling a fluid through a well to maintain well pressure during wellbore operations and produce the used fluid;
- receiving, at a pretreatment unit, the used fluid recovered from the well, wherein the used fluid recovered from the well comprises a brine based fluid;
- pretreating the fluid recovered from the well via at least one pretreatment unit to separate solids, oil, or a combination thereof from the fluid recovered from the well to generate a pretreated fluid stream;
- receiving the pretreated fluid stream into a membrane unit via an inlet of the membrane unit;
- contacting the pretreated fluid stream with a first membrane of the membrane unit, the first membrane comprising a porous substrate at least partially coated with graphene oxide;
- separating a first portion of the pretreated fluid stream from a second portion of the pretreated fluid stream via the first membrane, wherein the first portion of the pretreated fluid stream comprises water;
- outputting the first portion of the pretreated fluid stream via a first outlet of the membrane unit; and
- outputting the second portion of the pretreated fluid stream via a second outlet of the membrane unit, wherein the pretreated fluid stream is a first brine, wherein the first portion of the pretreated fluid stream is fresh water, and wherein the second portion of the pretreated fluid stream is a second brine, the second brine having a higher density that the first brine, wherein the higher density is in a range of from about 8.3 to 21 pounds per gallon.

10. The method of claim 9, wherein the porous substrate comprises a material construction selected from the group consisting of: sintered metal, porous ceramic, a polymer sheet, a bundle of fibers, and a sand pack.

11. The method of claim 9, further comprising:
separating a third portion of the pretreated fluid stream from the first and second portions of the fluid stream via a second membrane within the membrane unit, wherein the second membrane is hydrophobic, wherein the third portion comprises oil.

12. The method of claim 9, wherein pretreating the fluid recovered from the well comprises:
- removing solid waste from the brine-based fluid via a centrifuge, a solids filter, or both to generate a brine-water-oil mixture; and
- separating oil from the brine-water-oil mixture via an oil separation unit to generate the pretreated fluid stream.

13. The method of claim 9, further comprising:
- adding salt to the second brine to generate a third brine having a higher density than the second brine; and
- storing the third brine for reuse.

14. The method of claim 9, wherein the pretreated fluid stream is pretreated water with contaminants, and wherein the first portion of the pretreated fluid stream is potable water.

15. The method of claim 14, wherein pretreating the fluid recovered from the well comprises removing oil and solid waste via a centrifuge, a solids filter, or both to generate the pretreated fluid stream.

16. The fluid treatment system of claim 1, wherein the porous substrate has a pore size of less than 10 nanometers.

17. The fluid treatment system of claim 1, wherein a pressure differential between the first side and the second side is from 1 to 100 psi.

18. The fluid treatment system of claim 1, wherein a pressure differential between the first side and the second side is from 1 to 25 psi.

19. The fluid treatment system of claim 1, wherein a pressure differential between the first side and the second side is from 1 to 10 psi.

20. The fluid treatment system of claim 1, wherein the second brine is selected from potassium formate, cesium formate, zinc bromide, calcium bromide, calcium chloride, or a combination thereof.

* * * * *